United States Patent Office 2,902,222
Patented Sept. 1, 1959

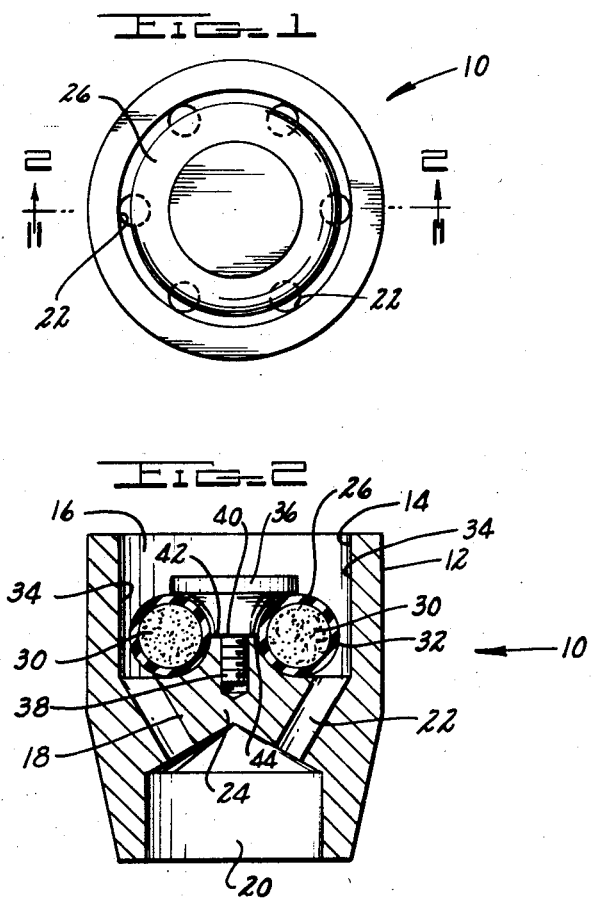

2,902,222

THERMOSTATIC FLOW CONTROL DEVICE

Thomas E. Noakes, Detroit, Mich., assignor, by mesne assignments, to American Radiator & Standard Sanitary Corporation, a corporation of Delaware Application October 12, 1956, Serial No. 615,699

2 Claims. (Cl. 236—93)

This invention relates to thermostatic flow control devices; i.e. devices which automatically vary or control volumetric fluid flow through passages in accordance with variations in fluid temperature. Such devices are useful in many applications, as for example in supply lines for domestic hot water systems and coolant lines in internal combustion engines.

Objects of the invention are, singly and collectively, to provide a thermostatic flow control device wherein:

(1) The device can be constructed as a relatively low cost item.

(2) The device can easily be installed in a fluid flow line without extensive modification or redesign of the line.

(3) The device can be constructed to occupy a comparatively small space, thereby permitting it to be utilized in small and difficultly accessible spaces.

(4) The design of the device renders it quickly sensitive to fluid temperature change, thereby giving substantially no greater or longer flow fluctuation (timewise) than that dictated by fluid temperature change.

(5) The device can be constructed as a "self-contained" unit, thereby permitting flexibility in its location in accordance with different installation conditions.

Other objects of this invention will appear in the following description and appended claims, reference being had to the accompanying drawings forming a part of this specification wherein like reference characters designate corresponding parts in the several views.

In the drawings:

Fig. 1 is a top plan view of one embodiment of the invention.

Fig. 2 is a sectional view on line 2—2 in Fig. 1.

Fig. 3 is a bottom plan view of the Fig. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a thermostatic flow control device 10 which includes a chamber-forming tube 12. The open upper end of tube 12 forms an inlet opening 14 and an inlet chamber 16. A wall 18 extends across an intermediate portion of tube 12 so as to form an outlet chamber 20. Chambers 16 and 20 communicate with one another through a series of openings 22 formed in wall 18. The central wall portion 24 of wall 18 serves to support an annular deformable envelope 26, and wall portions 28 between openings 22 serve as spokes for supporting wall portion 24 in spaced relation to the side wall of tube 12.

Envelope 26 is formed of rubber or other deformable material and is filled with a thermally expansible material 30. Material 30 may be any of several materials, as for example paraffin or para-dichlorobenzene. The choice of expansion material depends on the temperature and temperature fluctuation of the fluid passing through tube 12, as well as the extent to which it is desired to throttle fluid flow per any given temperature fluctuation. In this connection it will be appreciated that certain materials experience greater volumetric changes at their "expansion" or "transition" temperature ranges than other materials. The design of envelope 26 and its disposition along a substantial portion of the fluid flow path provides a comparatively large "surface area to material 22 volume" ratio and thereby insures a fairly rapid time response of material 30 to fluid temperature change; as a result the accuracy of the fluid-control operation is relatively high.

The operation of the illustrated device is such that at low fluid temperatures envelope 26 assumes its Fig. 2 position. The spacing between the outer peripheral surface 32 of envelope 26 and surface 34 of tube 12 is at a maximum, and fluid flow through mechanism 10 is at its greatest possible value. If the fluid flowing through the device should increase in temperature material 30 will increase its volumetric displacement so as to expand envelope 26 and reduce the spacing between surfaces 32 and 34; as a result fluid flow through mechanism 10 is decreased. Material 30 is preferably of such character that it expands and contracts over a range of temperatures as distinguished from a single temperature. By expanding over a range of temperatures material 30 is enabled to space surface 32 at several different distances from surface 34 according as the fluid temperature rises and falls within the expansion range. As a result a "quantity of flow" control can be effected instead of, or in addition to, the "on-off" control obtainable when surface 32 moves out of and into direct engagement with surface 34.

In some instances it is desirable that the annular opening between surfaces 32 and 34 undergo a relatively rapid and large change in size per unit temperature change of the fluid. In such instances it is preferred to provide an "envelope-confining" member 36 over a portion of envelope 26. Preferably member 36 includes a stud portion 38 which threads into a threaded bore in wall 18. For "ease of assembly" purposes the joint 40 between members 18 and 36 extends in an imaginary plane splitting envelope 26 into two equal sections. In assembly of the mechanism envelope 26 is placed on the upstream face of wall 18, after which element 36 is merely screwed down into the bore in wall 18 until surfaces 42 and 44 abut against one another as shown in Fig. 2.

In operation of mechanism 10 member 36 prevents the inner peripheral surface of envelope 26 from moving under the influence of material 30. As a result the outer peripheral portion of the envelope is caused to move outwardly a greater amount per unit temperature change of fluid than would be the case if envelope 26 were not confined by member 36.

The opposite ends of tube 12 may be suitably threaded or otherwise contoured to permit installation of the device at desired points in fluid lines and valving systems.

I claim:

1. A thermostatic flow control device comprising an open-ended tube; a wall extending across an intermediate portion of said tube to define an inlet chamber and an outlet chamber; at least one opening extending through said wall in the area thereof adjacent the tube side wall; a one piece annular envelope of deformable material positioned on the upstream face of said wall with its outer peripheral surface closely adjacent the tube side wall; rigid wall means extending from a central portion of said wall through the central opening in the envelope and into engagement with the upstream face of the envelope, whereby to leave exposed and unconfined only the envelope surface which is in visual communication with the tube side wall; and material contained within said envelope which substantially changes its volumetric displacement in response to temperature change; whereby fluid temperature change is effective to change the volumetric displacement of said contained material so as to move the unconfined wall portion of the envelope and thereby change the size of the flow path through the device.

2. A thermostatic flow control device comprising an open-ended tube; a wall extending across an intermediate portion of said tube to define an inlet chamber and an outlet chamber; at least one opening extending through said wall in the area thereof adjacent the tube side wall; a one piece annular envelope of deformable material positioned on the upstream face of said wall with its outer peripheral surface closely adjacent the tube side wall; said envelope being circular in cross sections taken through planes containing its axis; the central portion of the intermediate wall extending halfway through the central opening formed by the annular envelope, and said central portion conforming to the circular curvature of the envelope inner peripheral surface; a confining element removably locked on the upstream face of said central portion and extending into engagement with the upstream face of the envelope, whereby to leave exposed and unconfined only the envelope surface which is in visual communication with the tube side wall; and material contained within said envelope which substantially changes its volumetric displacement in response to temperature change; whereby fluid temperature change is effective to change the volumetric displacement of said contained material so as to move the unconfined wall portion of the envelope and thereby change the size of the flow path through the device.

References Cited in the file of this patent

UNITED STATES PATENTS

| | | |
|---|---|---|
| 20,388 | Hoard | May 25, 1858 |
| 1,089,929 | Leuthesser | Mar. 10, 1914 |
| 2,548,608 | Janos | Apr. 10, 1951 |